(12) United States Patent
Kanai et al.

(10) Patent No.: US 9,707,518 B2
(45) Date of Patent: Jul. 18, 2017

(54) HOLLOW FIBER MEMBRANE MODULE (71) Applicant: TORAY INDUSTRIES, INC., Tokyo (JP)

(72) Inventors: Hiroaki Kanai, Otsu (JP); Junji Itakura, Otsu (JP)

(73) Assignee: Toray Industries, Inc., Tokyo (JP)

( * ) Notice: Subject to any disclaimer, the term of this patent is extended or adjusted under 35 U.S.C. 154(b) by 173 days.

(21) Appl. No.: 14/412,288

(22) PCT Filed: Jun. 27, 2013

(86) PCT No.: PCT/JP2013/067655
§ 371 (c)(1),
(2) Date: Dec. 31, 2014

(87) PCT Pub. No.: WO2014/007138
PCT Pub. Date: Jan. 9, 2014

(65) Prior Publication Data
US 2015/0182916 A1    Jul. 2, 2015

(30) Foreign Application Priority Data

Jul. 5, 2012  (JP) ................................. 2012-151041

(51) Int. Cl.
*B01D 63/02*  (2006.01)
*C02F 1/44*  (2006.01)

(52) U.S. Cl.
CPC ........... *B01D 63/024* (2013.01); *B01D 63/02* (2013.01); *C02F 1/44* (2013.01); *C02F 1/444* (2013.01);

(Continued)

(58) Field of Classification Search
CPC ............ B01D 2313/10; B01D 2313/12; B01D 2313/20; B01D 2313/23; B01D 2319/04;
(Continued)

(56) References Cited

U.S. PATENT DOCUMENTS

2010/0072124 A1    3/2010  Morikawa et al.

FOREIGN PATENT DOCUMENTS

| JP | 10000339 | 1/1998 |
|----|----------|--------|
| JP | 2000037616 | 2/2000 |

(Continued)

OTHER PUBLICATIONS

International Search Report for International Application No. PCT/JP2013/067655 mailed Aug. 20, 2013.

*Primary Examiner* — John Kim
(74) *Attorney, Agent, or Firm* — RatnerPrestia (57) ABSTRACT

There is provided a hollow fiber membrane module including a cylindrical case having at least a discharge port for raw water in a side face thereof; a fixing member to which open ends of a large number of hollow fiber membranes forming a hollow fiber membrane bundle housed inside the cylindrical case are fixed; and a flow straightening cylinder which is provided between the discharge port for the raw water and an outer periphery of the hollow fiber membrane bundle, which is fixed to the fixing member, and which has a plurality of flow straightening holes. The flow straightening cylinder includes a large inner diameter portion and a small inner diameter portion and the small inner diameter portion is mounted to the fixing member with a lower face of the fixing member positioned at the small inner diameter portion.

9 Claims, 4 Drawing Sheets (52) U.S. Cl.
CPC ...... *B01D 2313/10* (2013.01); *B01D 2313/12* (2013.01); *B01D 2313/20* (2013.01); *B01D 2313/23* (2013.01); *B01D 2319/04* (2013.01); *C02F 2201/004* (2013.01); *C02F 2303/16* (2013.01)

(58) Field of Classification Search
CPC ......... B01D 63/02; B01D 63/024; C02F 1/44; C02F 1/444; C02F 2201/004; C02F 2303/16
See application file for complete search history.

(56) References Cited

FOREIGN PATENT DOCUMENTS

| | | |
|---|---|---|
| JP | 2010234198 | 10/2010 |
| JP | 2010234200 | 10/2010 |
| WO | 2008035593 | 3/2008 |

PRIOR ART

Fig. 5

HOLLOW FIBER MEMBRANE MODULE

CROSS REFERENCE TO RELATED APPLICATIONS

This is the U.S. National Phase application of PCT/JP2013/067655, filed Jun. 27, 2013, which claims priority to Japanese Patent Application No. 2012-151041, filed Jul. 5, 2012, the disclosures of each of these applications being incorporated herein by reference in their entireties for all purposes.

FIELD OF THE INVENTION

The present invention relates to a hollow fiber membrane module used for a water treatment such as a water purification treatment, production of industrial water, a wastewater treatment, and a reverse osmosis membrane pretreatment. Hollow fiber membranes used in the hollow fiber membrane module is configured of microfiltration membranes or ultrafiltration membranes, for example.

BACKGROUND OF THE INVENTION

External-pressure type hollow fiber membrane modules which filtrate water from the outside of the hollow fiber membranes to the inside hollow portions have various merits including the simplicity of the seal structure which separates raw water which has not underdone membrane filtration from filtrate obtained after membrane filtration, ease of operation management, etc. The greatest feature thereof resides in that the module can have an exceedingly large filtration membrane area per unit volume of the module. Because of this, the external-pressure type hollow membrane modules are being increasingly applied in recent years to water treatment processes for producing industrial water or tap water from river water, lake water, groundwater, seawater, household wastewater, or industrial wastewater.

When raw water is membrane-filtrated using the hollow fiber membrane module, substances which are contained in the raw water and are to be removed, such as suspended substances and organic matters, accumulate on outer surfaces of the membranes to cause a membrane clogging phenomenon. As a result, the filtration resistance of the membranes increases, shortly rendering the filtration impossible. Consequently, a general method for maintaining the membrane filtration performance is to periodically stop the membrane filtration and conduct physical cleaning of the filtration membranes.

Usually, the filtration step and the physical cleaning step are automatically conducted repeatedly. Examples of the physical cleaning include air scrubbing in which air is introduced into the lower part of the membrane module to oscillate the membranes in water to thereby shake off the suspended substances adherent to the outer surfaces of the membranes, back-pressure washing (back-washing) in which water (washing water) such as filtrate is forced into the membranes by pressure in the direction reverse to the filtration direction of the membrane module, i.e., from the hollow portion-side to the outer surfaces of the membranes, to remove the suspended substances adherent to the membranes, and air/back-pressure simultaneous washing in which the air scrubbing and the back-pressure washing are conducted simultaneously, etc.

The hollow fiber membrane module is generally configured of a cylindrical case and a hollow fiber membrane bundle housed in the cylindrical case. One end of the hollow fiber membrane bundle is fixed to one end of the cylindrical case by casting one potting material and the other end of the hollow fiber membrane bundle is fixed to the other end of the cylindrical case by casting the other potting material. The hollow fiber membrane bundle used here is usually configured of a bundle of hundreds to tens of thousands of hollow fiber membranes.

In the case of external-pressure type hollow fiber membrane modules, the one ends of the respective hollow fiber membranes fixed by the one potting material have openings configured of the hollow portions opening at an outer surface of the one potting material. The filtrate obtained by passage and filtration of the raw water through the hollow fiber membranes flows through the hollow portions to reach the openings and the filtrate which has passed through the openings flows to a filtrate outlet provided to the cylindrical case. The other ends of the respective hollow fiber membranes fixed by the other potting material usually have closed portions formed by sealing of the hollow portions inside the other potting material.

Well known as methods for the fixing by casting a potting material are a stationary method and a centrifugal method. The stationary method is a method in which a liquid potting material, e.g., resin having flowability, is fed with a constant delivery pump or the like from below the hollow fiber membrane bundle and the potting material is solidified (cured) at or near tip ends of the respective hollow fiber membranes. The centrifugal method is a method in which a liquid potting material is moved to the end of the case by centrifugal force and solidified (cured). The solidified potting material serves as a fixing member for fixing the respective hollow fiber membranes to the inside of the potting material and fixing the hollow fiber membrane bundle to the cylindrical case.

In either method, however, the resin having the flowability creeps up along the outer surfaces of the hollow fiber membranes to a height of about several millimeters to several centimeters at the interface between the hollow fiber membranes and the potting material to form an uneven resin surface and is solidified in this state. In the case where the hollow fiber membranes which have been fixed to the resin (fixing members) solidified in such a state receive oscillations generated during air scrubbing, local stress is imposed on the hollow fiber membranes at the uneven resin surfaces, resulting in hollow fiber membrane rupture in some cases.

To an upper side face of the cylindrical case housing the hollow fiber membrane bundle, a nozzle used for discharge of circulating water and wastewater is provided. The resin surface (lower face of the upper fixing member), on an inner side with respect to an axial direction of the cylindrical case, of the upper potting material (upper fixing member) is formed at substantially the same height position as an upper end of an inner flow path of the upper discharge nozzle so that the circulating water and the wastewater can be discharged efficiently.

If the resin surface (lower face of the upper fixing member), on the inner side of the cylindrical case, of the upper fixing member fixing the respective hollow fiber membranes is disposed above the upper end of the inner flow path of the upper discharge nozzle, air or suspended substances may stay in the space between the lower face of the upper fixing member and the upper end of the inner flow path of the upper discharge nozzle, resulting in degradation of turbidity removing performance and reduction in an effective membrane area of the hollow fiber membranes for filtration in this case.

Around the upper portion of the hollow fiber membrane bundle, a flow straightening cylinder having flow straightening holes is disposed and a discharge flow path communicating with the upper discharge nozzle is formed.

In order to further enhance the air scrubbing effect, Patent Document 1 proposes provision of slack to hollow fiber membranes housed in a cylindrical case. By fixing the opposite ends of the hollow fiber membranes to the bonded/fixed portions at opposite ends of the hollow fiber membranes while providing the slack to the hollow fiber membranes between bonded/fixed portions, the hollow fiber membranes oscillate to proper degrees during the air scrubbing and effective scrubbing can be conducted. However, during water discharge at a high flow rate, the hollow fiber membranes pushed by the discharged water and the air flow close the flow straightening holes to thereby cause a pressure loss or the hollow fiber membranes are pushed against the flow straightening holes and damaged.

To solve the problems, Patent Document 2 proposes a hollow fiber membrane module in which grooves connecting flow straightening holes are formed on an inner face of a flow straightening cylinder provided between a water discharge nozzle and a hollow fiber membrane bundle.

PATENT DOCUMENTS

Patent Document 1: Japanese Patent Laid-open Publication No. 10-000339A
Patent Document 2: WO2008/035593A1

SUMMARY OF THE INVENTION

Figure 4:
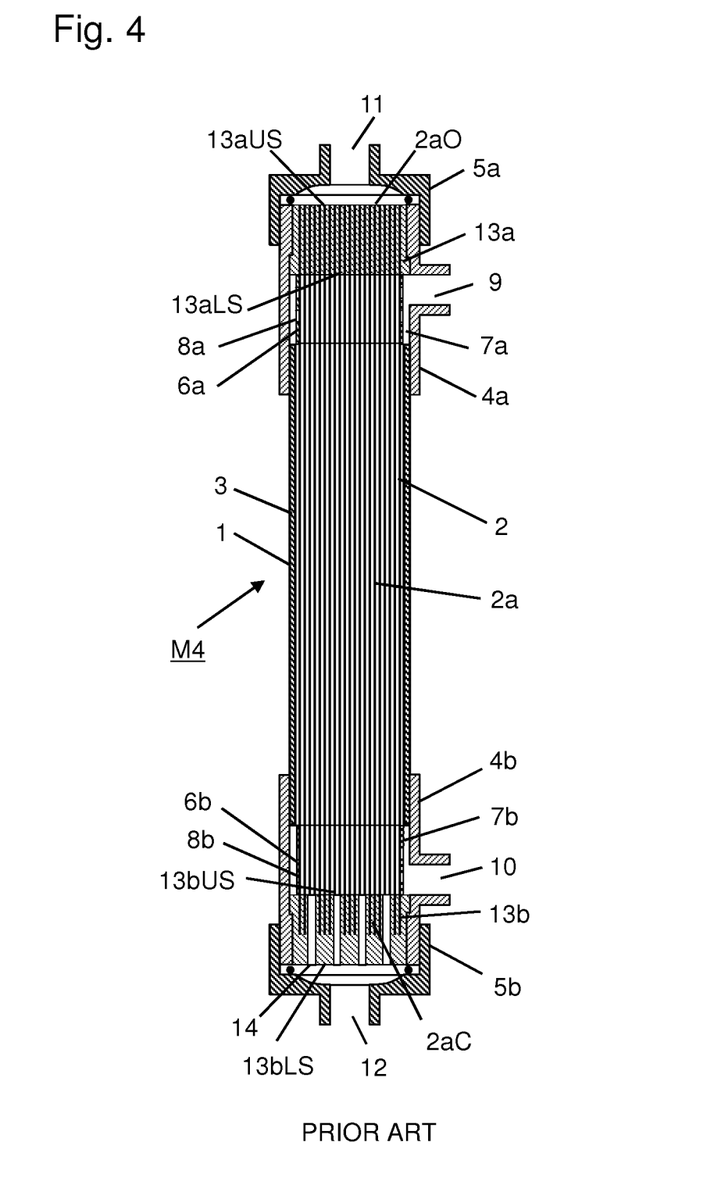
FIG. 4 is a diagrammatic vertical cross-sectional view of one example of conventional hollow fiber membrane modules.

Problems of conventional techniques will be described below with reference to FIG. 4 by taking a hollow fiber membrane module using a conventional flow straightening cylinder as an example. Hollow fiber membrane modules having the same structure as that of the conventional hollow fiber membrane module shown in FIG. 4 are described in many documents. Examples of such hollow fiber membrane modules include the hollow fiber membrane module shown in FIG. 1 in Patent Document 2.

In FIG. 4, a cylindrical case 1 in the conventional hollow fiber membrane module M4 is configured of a cylindrical case main body 3, an upper socket 4a mounted to an outer peripheral face of an upper end of the case main body 3, and a lower socket 4b mounted to an outer peripheral face of a lower end of the case main body 3. A discharge port 9 for raw water is provided to the upper socket 4a and a feed port 10 for the raw water is provided to the lower socket 4b. A hollow fiber membrane bundle 2 cut at opposite ends to have the same lengths is inserted into the cylindrical case 1. The hollow fiber membrane bundle 2 is configured of a bundle of a large number of hollow fiber membranes 2a.

Upper ends of the large number of hollow fiber membranes 2a are bonded/fixed by resin and the resin forms an upper fixing member 13a of the hollow fiber membrane bundle 2. A side peripheral face of the upper fixing member 13a is fixed to an inner peripheral face of an upper end of the upper socket 4a. The upper ends of the large number of hollow fiber membranes 2a fixed to the upper fixing member 13a are open to the outside at an upper surface 13aUS of the upper fixing member 13a and each of the hollow fiber membranes 2a has an opening 2aO. A lower surface 13aLS of the upper fixing member 13a is positioned inside the cylindrical case 1.

Lower ends of the large number of hollow fiber membranes 2a are bonded/fixed by resin and the resin forms a lower fixing member 13b of the hollow fiber membrane bundle 2. A side peripheral face of the lower fixing member 13b is fixed to an inner peripheral face of a lower end of the lower socket 4b. Hollow portions in the lower ends of the large number of hollow fiber membranes 2a fixed to the lower fixing member 13b are closed inside the lower fixing member 13b with resin used to form the lower fixing member 13b and each of the hollow fiber membranes 2a has a closed portion 2aC. An upper surface 13bUS of the lower fixing member 13b is positioned inside the cylindrical case 1 and a lower surface 13bLS of the lower fixing member 13b is positioned outside the cylindrical case 1.

To a peripheral face of the hollow fiber membrane bundle 2 at a position facing the feed port 10, a lower flow straightening cylinder 6b having a large number of flow straightening holes 8b is provided. Between an inner peripheral face of the lower socket 4b and an outer peripheral face of the lower flow straightening cylinder 6b, a lower annular flow path 7b is formed.

The raw water is fed from the feed port 10 provided to the lower socket 4b into the cylindrical case 1, passes from the lower annular flow path 7b through the flow straightening holes 8b provided to the lower flow straightening cylinder 6b, and flows along outer surfaces of the respective hollow fiber membranes 2a.

The raw water may be fed into the cylindrical case 1 from a second feed port 12 formed in a lower cap 5b provided to a lower end of the cylindrical case 1. In this case, the raw water fed from the second feed port 12 passes through through holes 14 provided to the lower fixing member 13b to penetrate the lower fixing member 13b in a vertical direction and flows along outer surfaces of the respective hollow fiber membranes 2a.

The raw water flowing along the outer surfaces of the respective hollow fiber membranes 2a permeates through membrane walls of the respective hollow fiber membranes 2a to reach the hollow portions of the hollow fiber membranes to be filtrate. The filtrate passes through the openings 2aO of the respective hollow fiber membranes 2a and is collected into an upper cap 5a provided to an upper end of the cylindrical case 1 and then taken out of the hollow fiber membrane module M4 from a filtrate outlet 11 provided to the upper cap 5a.

In a dead-end filtration method, the discharge port 9 for the raw water is closed and only the filtrate is taken out of the filtrate outlet 11. In a cross-flow method, on the other hand, the remaining raw water (concentrated water) which has not permeated through the hollow fiber membranes passes through flow straightening holes 8a in an upper flow straightening cylinder 6a provided to a peripheral face of the hollow fiber membrane bundle 2 at a position facing the discharge port 9 for the raw water and having the large number of flow straightening holes 8a, passes through an upper annular flow path 7a provided between an inner peripheral face of the upper socket 4a and an outer peripheral face of the upper flow straightening cylinder 6b, and is discharged out of the hollow fiber membrane module M4 from the discharge port 9 for the raw water.

If the conventional upper flow straightening cylinder 6a is used, when the raw water flowing along the outer surfaces of the respective hollow fiber membranes 2a passes through the flow straightening holes 8a from inside the upper flow straightening cylinder 6a and is discharged from the discharge port 9 through the upper annular flow path 7a, the hollow fiber membranes 2a positioned near an inner peripheral face of the upper flow straightening cylinder 6a is pushed by a flow of the discharged water against the flow straightening holes 8*a* and areas around the flow straightening holes 8*a* and the flow straightening holes 8*a* are liable to be closed in the case in which an amount of discharged water per unit time is excessively large.

After the end of a filtration step for a certain time, the air scrubbing in which air is fed from the second feed port 12 to shake off the suspended substances accumulating in the hollow fiber membrane module M4 and the back-pressure washing in which the filtrate is forced to flow from the side of the filtrate outlet 11 to the raw water side are conducted successively or both of them are conducted simultaneously. In these washing steps, when the discharged water or the air is caused to flow out from the discharge port 9, the hollow fiber membranes 2*a* are pushed against the flow straightening holes 8*a* and the areas around the flow straightening holes 8*a* and the flow straightening holes 8*a* are liable to be closed in the same way as in the above description.

In the hollow fiber membrane module shown in Patent Document 2, by using the structure described in this document, it is possible to prevent the hollow fiber membranes near the discharge port 9 from closing the flow straightening holes 8*a* provided to the upper flow straightening cylinder 6*a*. However, especially when the water discharge at a high flow rate is conducted, the hollow fiber membranes positioned at an outer peripheral portion of the hollow fiber membrane bundle 2 and the grooves provided to the inner surface of the upper flow straightening cylinder 6*a* come in contact with each other, which shaves and damages the hollow fiber membranes.

It is an object of the present invention to provide a hollow fiber membrane module with which a pressure loss in water discharge at a high flow rate can be reduced while damage to hollow fiber membranes can be prevented.

In order to solve this object, a hollow fiber membrane module according to an aspect of the present invention is formed as follows.

According to the aspect of the present invention, there is provided a hollow fiber membrane module including: a cylindrical case having one nozzle at the minimum in a side face thereof; a hollow fiber membrane bundle provided in the cylindrical case; and a flow straightening cylinder provided between the one nozzle at the minimum and an outer periphery of the hollow fiber membrane bundle and having a plurality of flow straightening holes, in which the hollow fiber membrane bundle includes a plurality of hollow fiber membranes, that are open at one ends and sealed at the other ends, or at least one U-shaped hollow fiber membrane (FIG. 5), that is open at opposite ends, and includes a hollow fiber membrane open end fixing member for fixing the open end of each of the hollow fiber membranes, a side peripheral face of the hollow fiber membrane open end fixing member is joined to an inner peripheral face of the cylindrical case, each of the hollow fiber membranes passes through the hollow fiber membrane open end fixing member, each of the openings is positioned at an outer surface of the hollow fiber membrane open end fixing member, the outer surface positioned outside the cylindrical case, and the flow straightening cylinder is fixed to the hollow fiber membrane open end fixing member, wherein the flow straightening cylinder includes a large inner diameter portion and a small inner diameter portion having a smaller inner diameter than an inner diameter of the large inner diameter portion at least at a part in an axial direction of the flow straightening cylinder and an inner surface of the hollow fiber membrane open end fixing member positioned on an opposite side from the outer surface and inside the cylindrical case is positioned at the small inner diameter portion of the flow straightening cylinder.

According to the aspect of the invention, preferably, the hollow fiber membrane bundle includes a plurality of hollow fiber membranes that are open at one ends and sealed at the other ends, the sealed end of each of the hollow fiber membranes is fixed to a hollow fiber membrane sealed end fixing member, a side peripheral face of the hollow fiber membrane sealed end fixing member is joined to an inner peripheral face of the cylindrical case, and the hollow fiber membrane sealed end fixing member has an inner surface positioned inside the cylindrical case and an outer surface positioned outside the cylindrical case.

According to the aspect of the invention, preferably, a length, in an axial direction of the cylindrical case, of the small inner diameter portion from the inner surface of the hollow fiber membrane open end fixing member toward the large inner diameter portion is in the range of 3 mm to 40 mm.

According to the aspect of the invention, preferably, when a cross-sectional area of the small inner diameter portion of the flow straightening cylinder is SA and a cross-sectional area of the large inner diameter portion is LA, a ratio between SA and LA satisfies a relationship, $0.6 \leq SA/LA \leq 50.9$.

According to the aspect of the invention, preferably, all of the plurality of flow straightening holes of the flow straightening cylinder are provided at the large inner diameter portion.

According to the aspect of the invention, preferably, the flow straightening cylinder has an inner diameter length transition zone in which an inner diameter of the flow straightening cylinder changes from an inner diameter satisfying the cross sectional area SA of the small inner diameter portion to an inner diameter satisfying the cross-sectional area LA of the large inner diameter portion between the small inner diameter portion and the large inner diameter portion.

According to the aspect of the invention, preferably, when the inner diameter of the large inner diameter portion is LD, the inner diameter of the small inner diameter portion is SD, a hollow fiber membrane length between the inner surface of the hollow fiber membrane open end fixing member and the inner surface of the hollow fiber membrane sealed end fixing member is FL, and a distance, in the axial direction of the cylindrical case, between the inner surface of the hollow fiber membrane open end fixing member and the inner surface of the hollow fiber membrane sealed end fixing member is CL, the flow straightening cylinder satisfies a relationship, $(LD-SD) > (FL-CL)/2$.

According to the aspect of the invention, preferably, a filling rate of the hollow fiber membranes in the hollow fiber membrane bundle positioned at the small inner diameter portion is in the range of 30% to 80%.

According to the aspect of the invention, preferably, an outer diameter of the flow straightening cylinder at a portion where the small inner diameter portion is formed is smaller than an outer diameter of the flow straightening cylinder at a portion where the large inner diameter portion is formed.

With the hollow fiber membrane module according to the aspect of the present invention, it is possible to reduce a pressure loss in water discharge at a high flow rate while preventing damage to the hollow fiber membranes caused by contact of the hollow fiber membranes with the flow straightening holes.

DETAILED DESCRIPTION OF EMBODIMENTS OF THE INVENTION

One embodiment of hollow fiber membrane modules according to the present invention is explained below while referring to FIGS. 1, 2, and 5. The hollow fiber membrane module described here is used as a filtration device for raw water for producing tap water (drinking water).

Figure 1:
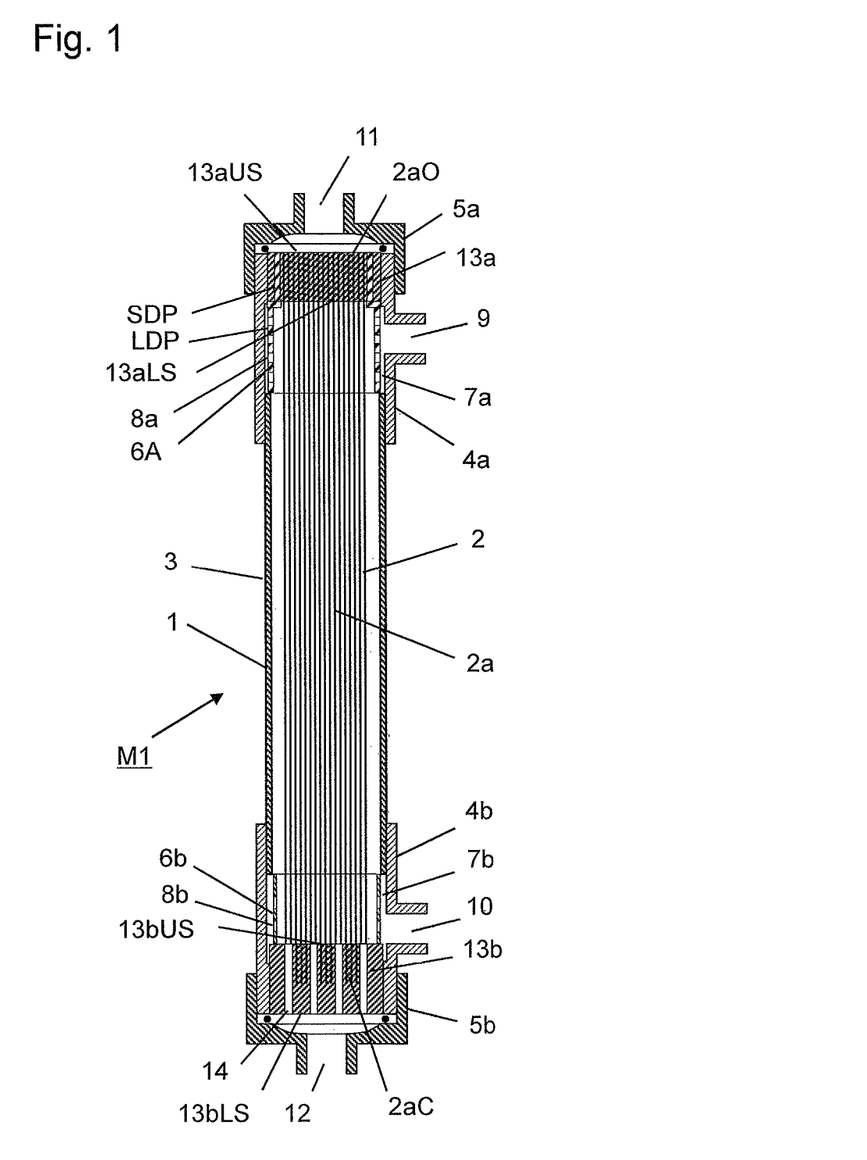
FIG. 1 is a diagrammatic vertical cross-sectional view showing one example of hollow fiber membrane modules according to the invention.
Figure 2:
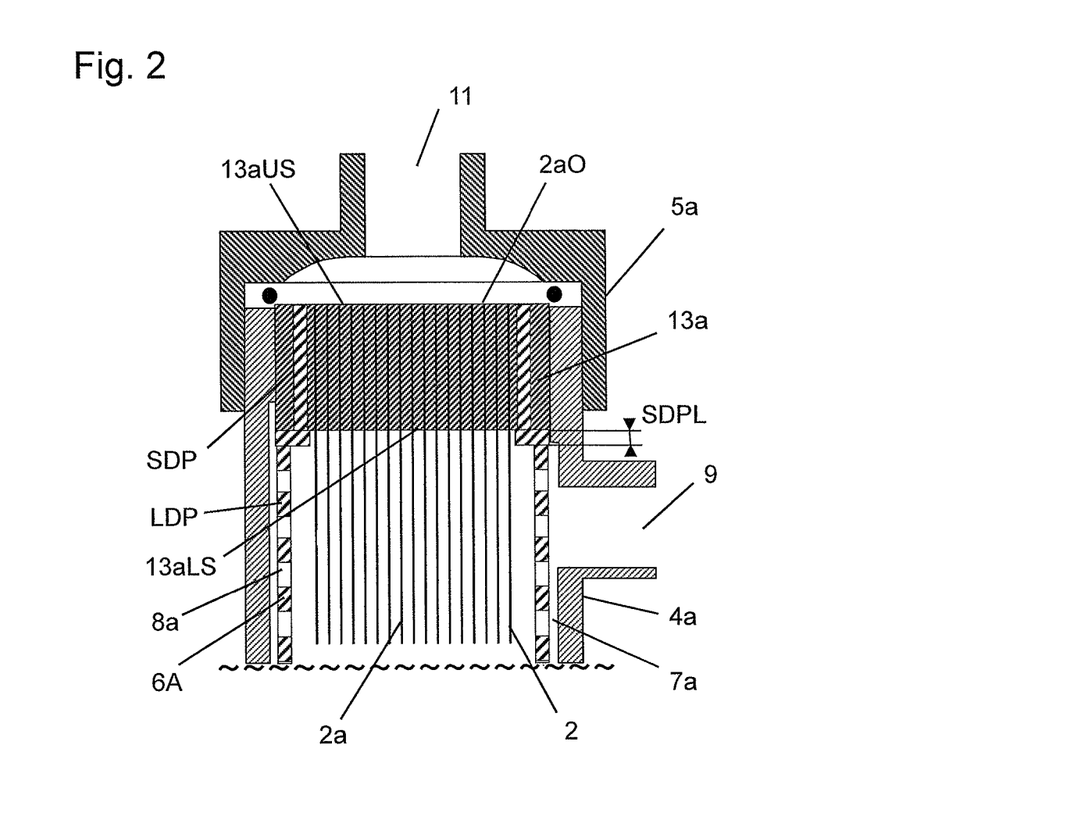
FIG. 2 is a vertical cross-sectional enlarged view of a hollow fiber membrane open end fixing member (upper fixing member) and an area near the member of a hollow fiber membrane module according to the invention shown in FIG. 1.
Figure 5:
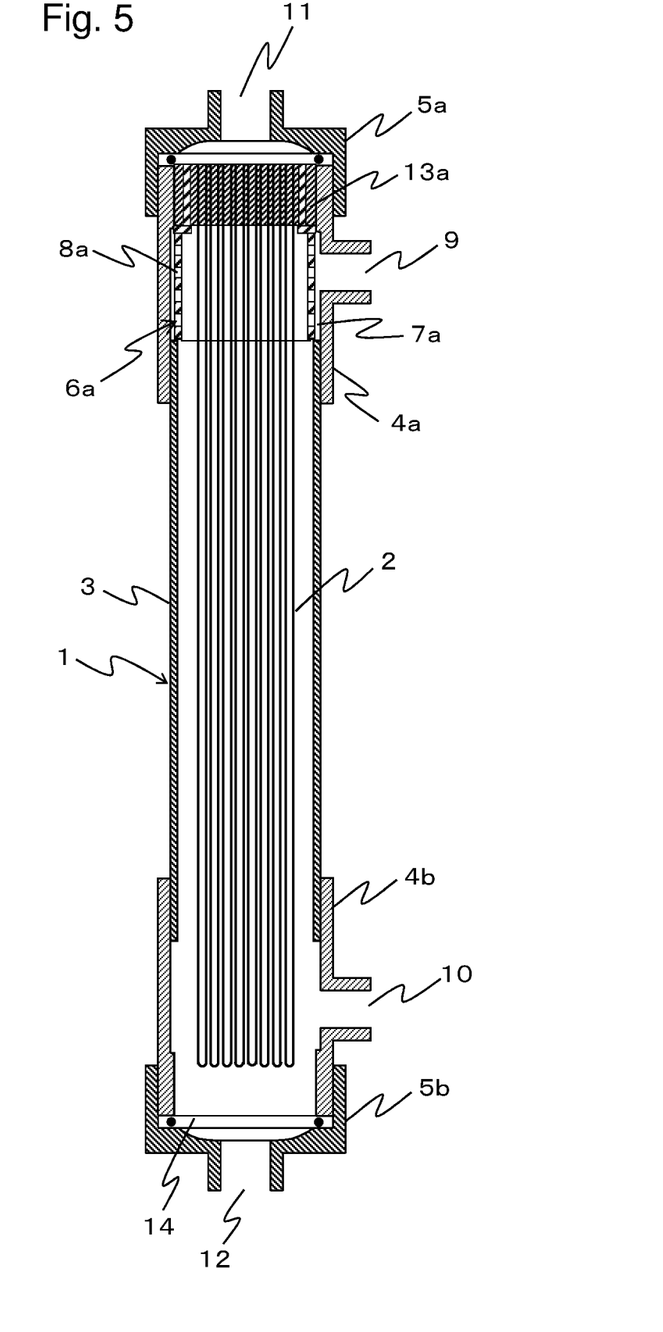
FIG. 5 is a diagrammatic vertical cross-sectional view showing one example of hollow fiber membrane modules according to the invention.

Out of respective components forming the hollow fiber membrane module according to the invention shown in FIGS. 1, 2, and 5, the same components as those forming the hollow fiber membrane module shown in FIG. 4 are provided with the same reference signs as those provided to the components used in FIG. 4 in FIGS. 1, 2, and 5.

The hollow fiber membrane module M1 shown in FIG. 1 is configured of a cylindrical case 1 and a hollow fiber membrane bundle 2 provided in the cylindrical case 1. The cylindrical case 1 is configured of a cylindrical case main body 3, an upper socket 4a mounted to an outer peripheral face of an upper end of the case main body 3, and a lower socket 4b mounted to an outer peripheral face of a lower end of the case main body 3.

The upper socket 4a has a discharge port (nozzle) 9 for raw water at a portion of its peripheral face. Between the upper socket 4a and an outer peripheral face of the hollow fiber membrane bundle 2, an upper flow straightening cylinder 6A having a plurality of flow straightening holes 8a is provided. Between an outer peripheral face of the upper flow straightening cylinder 6A and an inner peripheral face of the upper socket 4a, an upper annular flow path 7a is formed.

The hollow fiber membrane bundle 2 is configured of a bundle of a large number of hollow fiber membranes 2a. A hollow portion of each of the hollow fiber membranes 2a is open at one end and sealed at the other end. The open end of each of the hollow fiber membranes 2a is fixed to a hollow fiber membrane open end fixing member (upper fixing member) 13a. The hollow fiber membrane open end fixing member (upper fixing member) 13a is fixed to the cylindrical case 1 by joining of a side peripheral face of the hollow fiber membrane open end fixing member (upper fixing member) 13a to the inner peripheral face of the upper socket 4a.

Each of the hollow fiber membranes 2a penetrates the hollow fiber membrane open end fixing member (upper fixing member) 13a and the hollow portion of each of the hollow fiber membranes 2a is open at an upper surface (outer surface) 13aUS of the hollow fiber membrane open end fixing member (upper fixing member) 13a to form an opening 2aO. An upper end of the upper flow straightening cylinder 6a is fixed to the hollow fiber membrane open end fixing member (upper fixing member) 13a.

The upper flow straightening cylinder 6A has a large inner diameter portion LDP at its lower portion and a small inner diameter portion SDP having a smaller inner diameter SD than an inner diameter LD of the large inner diameter portion LDP at its upper portion in an axial direction. A lower surface (inner surface) 13aLS of the hollow fiber membrane open end fixing member (upper fixing member) 13a which is on an opposite side from the upper surface (outer surface) 13aUS of the hollow fiber membrane open end fixing member (upper fixing member) 13a and positioned inside the cylindrical case 1 is positioned at the small inner diameter portion SDP of the upper flow straightening cylinder 6A.

Although the hollow fiber membrane bundle 2 in which the hollow portion of each of the hollow fiber membranes 2a is open at one end and sealed at the other end is described above, it is also possible to use a hollow fiber membrane bundle 2 in which each of hollow fiber membranes 2a has a U or loop shape, has opposite ends fixed to a hollow fiber membrane open end fixing member (upper fixing member) 13a, and the opposite ends are open on an upper surface (outer surface) 13aUS of the hollow fiber membrane open end fixing member (upper fixing member) 13a. One example of the hollow fiber membrane bundles configured of the loop-shaped hollow fiber membranes is shown in FIG. 4 in Patent Document 1.

By integrating the upper flow straightening cylinder 6A having the large inner diameter portion LDP and the small inner diameter portion SDP described above into the cylindrical case 1, it is possible to provide the hollow fiber membrane module M1 which is the object of the invention and with which a pressure loss in water discharge at a high flow rate can be reduced while damage to the hollow fiber membranes can be prevented.

On the other hand, although the hollow fiber membrane bundle 2 in which each of the hollow fiber membranes 2a hangs downward from the hollow fiber membrane open end fixing member (upper fixing member) 13a and has the sealed lower end is described above, a position of the lower end of each of the hollow fiber membranes 2a in the cylindrical case 1 may become unstable due to movement of the raw water fed from an opening at a lower end of the cylindrical case 1 in this case. Therefore, it is common practice to provide a member for fixing the lower end of each of the hollow fiber membranes 2a to the cylindrical case 1. Because this member is employed in many conventional hollow fiber membrane modules, the member is briefly described here while referring to FIG. 1.

In other words, the cylindrical case 1 has the lower socket 4b provided to its lower end. A feed port 10 for raw water is provided to a portion of an outer peripheral face of the lower socket 4b. The lower end of each of the hollow fiber membranes 2a is fixed by a hollow fiber membrane sealed end fixing member (lower fixing member) 13b and the hollow portion at the lower end of each of the hollow fiber membranes 2a is sealed with resin forming the hollow fiber membrane sealed end fixing member (lower fixing member) 13b in the hollow fiber membrane sealed end fixing member (lower fixing member) 13b to form a closed portion 2aC.

An outer peripheral face of the hollow fiber membrane sealed end fixing member (lower fixing member) 13b is joined to an inner peripheral face of a lower end of the lower socket 4b. Between the feed port 10 of the lower socket 4b and an outer peripheral face of the hollow fiber membrane bundle 2 facing the feed port 10, a lower flow straightening cylinder 6b having a large number of flow straightening holes 8b is provided and a lower end of the lower flow straightening cylinder 6b is fixed to the hollow fiber membrane sealed end fixing member (lower fixing member) 13b.

Between the inner peripheral face of the lower socket 4b and an outer peripheral face of the lower flow straightening cylinder 6b, a lower annular flow path 7b is formed. An upper surface (inner surface) 13bUS is formed on a surface of the hollow fiber membrane sealed end fixing member (lower fixing member) 13b and positioned inside the cylindrical case 1 and a lower surface (outer surface) 13bLS is formed on a surface of the hollow fiber membrane sealed end fixing member (lower fixing member) 13b and positioned outside the cylindrical case 1.

The raw water is fed from the feed port 10 for the raw water into the cylindrical case 1, flows through the lower annular flow path 7b, passes through the flow straightening holes 8b of the lower flow straightening cylinder 6b, and flows along outer surfaces of the respective hollow fiber membranes 2a. On the other hand, if a lower cap 5b is provided to the lower end of the cylindrical case 1, it is possible to feed the raw water into the cylindrical case 1 from a second feed port 12 provided to the lower cap 5b. In this case, through holes 14 through which the raw water can pass are provided to the hollow fiber membrane sealed end fixing member (lower fixing member) 13b. The raw water fed from the second feed port 12 passes through the through hales 14 and flows along the outer surfaces of the respective hollow fiber membranes 2a.

The raw water flowing along the outer surfaces of the respective hollow fiber membranes 2a permeates through membrane walls of the respective hollow fiber membranes 2a to reach the hollow portions of the hollow fiber membranes to be filtrate. The filtrate passes through the openings 2aO of the respective hollow fiber membranes 2a and is collected into an upper cap 5a provided to an upper end of the cylindrical case 1 and then taken out of the hollow fiber membrane module M1 from a filtrate outlet 11 provided to the upper cap 5a.

In a dead-end filtration method, the discharge port 9 for the raw water is closed and only the filtrate is taken out of the filtrate outlet 11. In a cross-flow method, on the other hand, the remaining raw water (concentrated water) which has not permeated through the hollow fiber membranes passes through the flow straightening holes 8a of the upper flow straightening cylinder 6A which is provided to a peripheral face of the hollow fiber membrane bundle 2 at a position facing the discharge port 9 for the raw water and has the large number of flow straightening holes 8a, passes through the upper annular flow path 7a provided between the inner peripheral face of the upper socket 4a and the outer peripheral face of the upper flow straightening cylinder 6A, and is discharged out of the hollow fiber membrane module M1 from the discharge port 9 for the raw water.

In this embodiment, the hollow fiber membrane open end fixing member (upper fixing member) 13a and the hollow fiber membrane sealed end fixing member (lower fixing member) 13b are formed by the conventionally-used potting method which has been described above and which uses the resin having the flowability.

In order to make the respective hollow fiber membranes 2a open at the upper surface 13aUS of the hollow fiber membrane open end fixing member (upper fixing member) 13a, an adhesive is applied on an end face of the hollow fiber membrane bundle 2 to prevent a potting material from entering the hollow portions of the respective hollow fiber membranes 2a before the potting and the potting material is fed by a centrifugal method. Then, after the potting material is cured, an opening-side end of the formed member may be cut off. To form the through holes 14 in the hollow fiber membrane sealed end fixing member (lower fixing member) 13b, metal pins or the like are arranged in positions for the potting and the potting material is fed by the centrifugal method. Then, when the potting material is cured, the pins may be pulled out.

In the hollow fiber membrane module M1 shown in FIG. 1, because a clearance is provided between an inner face of the upper flow straightening cylinder 6A provided with the flow straightening holes 8a and the outer face of the hollow fiber membrane bundle 2, the pressure loss in the water discharge at the high flow rate can be reduced while the damage to the hollow fiber membranes 2a can be prevented. A shape of the upper flow straightening cylinder 6A used in the hollow fiber membrane module M1 is described below in detail.

Figure 3:
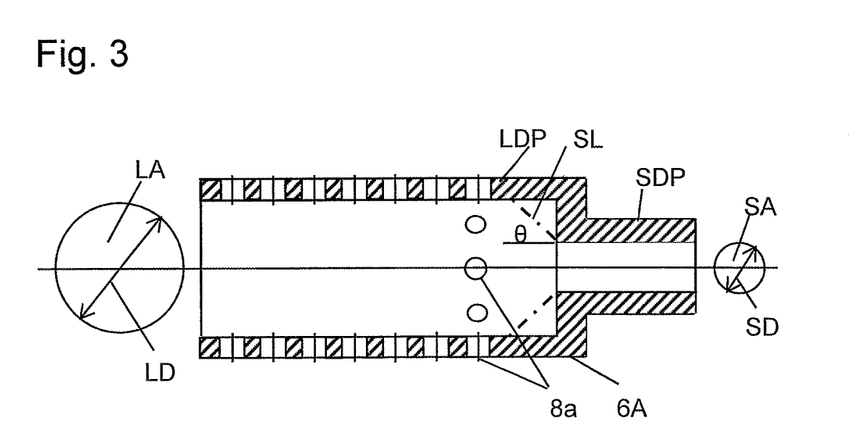
FIG. 3 is a diagrammatic vertical cross-sectional view of one example of upper flow straightening cylinders used for the hollow fiber membrane module according to the invention, to which lateral cross-sectional views of left and right inner diameter portions are added.

The upper flow straightening cylinder 6A used in the hollow fiber membrane module has the large inner diameter portion LDP and the small inner diameter portion SDP having the smaller inner diameter SD than the inner diameter LD of the large inner diameter portion LDP and has a step between the inner diameter SD of the small inner diameter portion SDP and the inner diameter LD of the large inner diameter portion LDP as shown as one example in FIG. 3. Because the small inner diameter portion SDP prevents increase in an outer diameter of the hollow fiber membrane bundle 2, the clearance is formed between the flow straightening holes 8a of the upper flow straightening cylinder 6A and the hollow fiber membrane bundle 2. In this way, the hollow fiber membranes 2a are prevented from closing the flow straightening holes 8a and the pressure loss is maintained low. Moreover, because the hollow fiber membranes 2a are less liable to come in contact with the flow straightening holes 8a, the damage to the hollow fiber membranes 2a is prevented.

Furthermore, when an inner cross-sectional area of the small inner diameter portion SDP is SA and an inner cross-sectional area of the large inner diameter portion LDP is LA, the ratio SA/LA preferably satisfies a relationship of $0.6 \leq SA/LA \leq 50.9$. If the ratio is smaller than 0.6, an area of the hollow fiber membranes 2a per unit area reduces. On the other hand, if the ratio exceeds 0.9, the clearance between the flow straightening holes 8a of the upper flow straightening cylinder 6A and the hollow fiber membrane bundle 2 becomes small and the hollow fiber membranes 2a may come in contact with the flow straightening holes 8a to cause increase in the pressure loss and damage to the hollow fiber membranes 2a in the water discharge in some cases.

Furthermore, preferably, the step is formed between the inner diameter of the small inner diameter portion SDP and the inner diameter of the large inner diameter portion LDP and the ratio SA/LA between the cross-sectional areas is obtained due to the step.

Here, the step means, on an inner surface of the upper flow straightening cylinder 6A, a difference between the inner diameter of the small inner diameter portion SDP and the inner diameter of the large inner diameter portion LDP when an inclination θ which a line segment SL (shown in a one-dot-chain line in FIG. 3) connecting an end (lower end) of the small inner diameter portion SDP on a side of the large inner diameter portion LDP and an end (upper end) of the large inner diameter portion LDP on a side of the small inner diameter portion SDP in a vertical section makes with respect to the axial direction of the upper flow straightening cylinder 6A is 45° or larger. A zone between a start point on the side of the small inner diameter portion SDP and an end point on the side of the large inner diameter portion LDP of the line segment SL in the axial direction of the upper flow straightening cylinder 6A is an inner diameter transition zone. Within the inner diameter transition zone, a value of the inner diameter of the upper flow straightening cylinder 6A changes from the value of the inner diameter of the small inner diameter portion SDP to the value of the inner diameter of the large inner diameter portion LDP continuously or step by step.

The inclination θ is preferably 60° or larger. If the inclination θ is a gentle inclination smaller than 45°, the hollow fiber membranes 2a and the upper flow straightening cylinder 6A come in contact with each other to cause the damage to the hollow fiber membranes 2a in some cases. By obtaining the ratio SA/LA between the cross-sectional areas due to the step having the inclination θ of 60° or larger, it is possible to more satisfactorily prevent contact between the hollow fiber membranes 2a and the flow straightening cylinder 6A.

It is preferred that a filling rate of the hollow fiber membranes 2a in the hollow fiber membrane bundle 2 in the small inner diameter portion SDP is in the range of 30% to 80%. If the filling rate is lower than 30%, the filling rate of the hollow fiber membranes 2a in the small inner diameter portion SDP is low, the hollow fiber membranes 2a oscillate excessively at the lower surface 13aLS of the hollow fiber membrane open end fixing member (upper fixing member) 13a, and the hollow fiber membranes 2a at the lower surface 13aLS may be cut in some cases during the water discharge at the high flow rate.

If the filling rate exceeds 80%, it may become difficult to insert the hollow fiber membrane bundle 2 into the cylindrical case 1 in a manufacturing process of the hollow fiber membrane module M1. Here, the filling rate of the hollow fiber membranes 2a in the hollow fiber membrane bundle 2 refers to a percentage of the total cross-sectional area of the hollow fiber membranes 2a forming the hollow fiber membrane bundle 2 in a cross-sectional area surrounded with the hollow fiber membranes 2a positioned at an outermost periphery of the hollow fiber membrane bundle 2 in the small inner diameter portion SDP.

Preferably, the small inner diameter portion SDP is not provided with the flow straightening holes 8a and the large inner diameter portion LDP is provided with the flow straightening holes 8a. In other words, all the flow straightening holes 8a are preferably provided to the large inner diameter portion LDP. With this structure, the hollow fiber membranes 2a positioned at the outer peripheral portion of the hollow fiber membrane bundle 2 are prevented from being pushed by the water or air and drawn into the flow straightening holes 8a during the water discharge at the high flow rate.

In the hollow fiber membrane module in the invention, it is preferred that the lower surface 13aLS of the hollow fiber membrane open end fixing member (upper fixing member) 13a fixing the hollow fiber membrane bundle 2 and the upper flow straightening cylinder 6A to the upper end of the cylindrical case 1 is positioned in an inner space of the small inner diameter portion SDP of the upper flow straightening cylinder 6A. With this structure, the excessive oscillation of the hollow fiber membranes 2a is prevented. As a result, the cut of the hollow fiber membranes 2a at the lower surface 13aLS of the hollow fiber membrane open end fixing member (upper fixing member) 13a is prevented.

An inner surface of the small inner diameter portion SDP preferably extends inward (downward) in the axial direction of the cylindrical case 1 in the range of 3 mm to 40 mm of a length SDPL from the lower surface 13aLS. In other words, the length SDPL from the lower surface (inner surface) of the hollow fiber membrane open end fixing member (upper fixing member) to a lower end face of the small inner diameter portion in the axial direction of the upper flow straightening cylinder 6A is preferably in the range of 3 mm to 40 mm.

If the hollow fiber membrane open end fixing member (upper fixing member) 13a is formed by the centrifugal potting, permeation of the potting material (resin having the flowability) along the outer surfaces of the hollow fiber membranes 2a can be kept below 3 mm. In the case of the stationary method, however, if the potting material (resin having the flowability) has a low viscosity, the permeation becomes 20 mm or greater. By extending the small inner diameter portion SDP farther inward (downward) than the permeation height of the lower surface 13aLS, the cut of the hollow fiber membranes 2a at the uneven resin surface is prevented. The small inner diameter portion SDP is preferably extended inward (downward) 3 mm or greater from the permeation height.

On the other hand, if the lower surface 13aLS is positioned at a distance longer than 40 mm from the lower end face of the small inner diameter portion SDP, air becomes liable to accumulate in a clearance between the lower surface 13aLS and the lower end face of the small inner diameter portion SDP. As a result, an effective membrane area of the hollow fiber membranes 2a reduces.

By setting an outer diameter of the flow straightening cylinder 6A at the position of the small inner diameter portion SDP to a smaller value than an outer diameter of the flow straightening cylinder 6A at the position of the large inner diameter portion LDP, it is possible to widen the upper annular flow path 7a for discharging the water from inside the hollow fiber membrane module M1. As a result, the pressure loss in the flow of the raw water is reduced.

The material of the hollow fiber membranes 2a forming the hollow fiber membrane bundle 2 is not particularly limited, and examples of the material include polysulfone, polyethersulfone, polyacrylonitrile, polyimide, polyetherimide, polyamide, polyether ketone, polyether ether ketone, polyethylene, polypropylene, an ethylene-vinylalcohol copolymer, cellulose, cellulose acetate, polyvinylidene fluoride, an ethylene-tetrafluoroethylene copolymer, polytetrafluoroethylene, and a composite material of these materials. Of these, polyvinylidene fluoride has excellent chemical resistance and, hence, if periodical washing of the hollow fiber membrane module M1 with a chemical is conducted to recover the filtration function of the hollow fiber membranes 2a, use of polyvinylidene fluoride leads to prolongation of the life of the hollow fiber membrane module M1. Therefore, polyvinylidene fluoride is used preferably as the material of the hollow fiber membrane.

An outer diameter of each of the hollow fiber membranes 2a is preferably in the range of 0.3 to 3 mm. If the outer diameter of the hollow fiber membrane 2a is excessively small, the hollow fiber membrane 2a may be bent and damaged during manufacture of the hollow fiber membrane module M1, in which the hollow fiber membrane 2a is treated, and during use of the hollow fiber membrane module M1, in which the filtration and the washing are conducted. If the outer diameter of the hollow fiber membrane 2a is excessively large, on the other hand, the number of hollow fiber membranes 2a which can be inserted into the cylindrical case 1 of the same size reduces, resulting in reduction in a filtration area in some cases.

A membrane thickness of each of the hollow fiber membranes 2a is preferably in the range of 0.1 to 1 mm. If the membrane thickness of the hollow fiber membrane 2a is excessively small, the hollow fiber membrane 2a may be bent due to pressure during use of the hollow fiber membrane module M1. If the membrane thickness of the hollow fiber membrane 2a is excessively large, on the other hand, it may lead to increase in the pressure loss during use of the hollow fiber membrane module M1 and increase in material cost.

As values of physical properties of the hollow fiber membrane 2a, it is preferred to take a longitudinal elastic modulus and second moment of area into consideration. For example, if the hollow fiber membrane 2a having the outer diameter of 1.5 mm, the inner diameter of 1 mm, the second moment of area of 0.2 $mm^4$, the longitudinal elastic modulus of 200 MPa, the membrane length of 2000 mm, and the transmembrane pressure difference of 100 kPa during water discharge is used, a clearance of about 10 mm may be provided between the hollow fiber membrane bundle 2 and the flow straightening holes 8a.

If the hollow fiber membrane 2a is a weak hollow fiber membrane having small longitudinal elastic modulus and second moment of area, it is possible to reduce the pressure loss in the water discharge at the high flow rate while preventing damage to hollow fiber membrane, when the following relationship is satisfied.

In other words, when the inner diameter of the small inner diameter portion SDP is SD, the inner diameter of the large inner diameter portion LDP is LD, the length of the hollow fiber membrane 2a between the lower surface (inner surface) 13aLS of the hollow fiber membrane open end fixing member (upper fixing member) 13a and the upper surface (inner surface) 13bUS of the hollow fiber membrane sealed end fixing member (lower fixing member) 13b is FL, and a distance in the axial direction of the cylindrical case 1 between the lower surface (inner surface) 13aLS of the hollow fiber membrane open end fixing member (upper fixing member) 13a and the upper surface (inner surface) 13bUS of the hollow fiber membrane sealed end fixing member (lower fixing member) 13b is CL, it is preferred that the relationship, LD−SD>(FL−CL)/2 is satisfied.

As materials forming the case main body 3, the upper socket 4a, the lower socket 4b, the upper cap 5a, the lower cap 5b, the upper flow straightening cylinder 6A, and the lower flow straightening cylinder 6b, the following materials can be used, for example.

Examples of the material for forming these members include polyolefins such as polyethylene, polypropylene, and polybutene, fluorine resins such as polytetrafluoroethylene (PTFE), perfluoroalkoxy (PFA), tetrafluoroethylene-hexafluoropropylene copolymer (FEP), ethylene-tetrafluoroethylene copolymer (ETFE), polychlorotrifluoroethylene (PCTFE), ethylene-chlorotrifluoroethylene copolymer (ECTFE), and vinylidene fluoride (PVDF), chloride resins such as polyvinyl chloride and polyvinylidene chloride, and a polysulfone resin, a polyethersulfone resin, a polyallylsulfone resin, a polyphenylether resin, an acrylonitrile-butadiene-styrene copolymer resin (ABS), an acrylonitrile-styrene copolymer resin, a polyphenylenesulfide resin, a polyamide resin, a polycarbonate resin, a polyether ketone resin, and a polyether ether ketone resin. These resins can be used alone or as a mixture thereof.

Other than the resins, aluminum, stainless steel, and the like are preferred and composite materials such as a composite material of a resin and a metal, glass fiber-reinforced resins, and carbon fiber-reinforced resins are used.

The case main body 3, the upper socket 4a, the lower socket 4b, the upper cap 5a, the lower cap 5b, the upper flow straightening cylinder 6A, and the lower flow straightening cylinder 6b may be made of the same material or different materials.

Size of the hollow fiber membrane module M1 is not particularly limited. In other words, the outer diameter and the axial length, for example, are not particularly limited. However, because a module with greater bore and length has a larger filtration area per unit area in general, such a module is used preferably. With the module with greater bore and length, a water treatment amount per unit time increases and therefore the effects of the invention are exerted sufficiently.

As the potting material (resin) for forming the hollow fiber membrane open end fixing member (upper fixing member) 13a and the hollow fiber membrane sealed end fixing member (lower fixing member) 13b, a thermosetting resin which is liquid initially is used preferably.

Since the potting material (resin) is required to have the strength required for tube plates that separate the inside of the hollow fiber membrane bundle 2 from the outside thereof, it is preferred that the potting material (resin) has a D hardness of 50 to 85. D hardness is a value measured after 10-second indentation with a type D durometer in accordance with JIS K 6253. Specific examples of the resin include epoxy and polyurethane. Each fixing member need not be a single layer constituted of one resin, and may be configured of a plurality of layers.

Although the hollow fiber membrane bundle 2 in which the respective hollow fiber membranes 2a are positioned straight in the vertical direction and which have the opposite ends respectively fixed by the fixing members 13a and 13b to the upper portion and the lower portion of the cylindrical case 1 has been described, a hollow fiber membrane module in which a hollow fiber membrane bundle is bent into a U shape and has open ends fixed to a fixing member 13a may be employed. Alternatively, what is called a cartridge-type hollow fiber membrane module in which a hollow fiber membrane cartridge configured of a hollow fiber membrane bundle is mounted into a housing may be employed.

Example 1

About 9,000 hollow fiber membranes, each of which was made of polyvinylidene fluoride (inner diameter, 1.0 mm; outer diameter, 1.5 mm) and had a length of about 2,000 mm, were bundled, and the resultant was inserted into a casing made of polyvinyl chloride and having an inner diameter of about 200 mm. A urethane resin which had a D hardness of 75 and which had been formed using a modified polyisocyanate and a modified polyol as starting materials was cast to fix both ends of the bundle by a centrifugal method so that the resin had a thickness of about 100 mm on each of the open side and the sealed side. Thus, an external-pressure type hollow fiber membrane module M1 shown in FIG. 1 was produced.

A length FL of each of the hollow fiber membranes 2a between a lower surface 13aLS of a hollow fiber membrane open end fixing member (upper fixing member) 13a and an upper surface 13bUS of a hollow fiber membrane sealed end fixing member (lower fixing member) 13b was 1,810 mm and a distance CL, in an axial direction of the cylindrical case 1, between the lower surface 13aLS and the upper surface 13bUS was 1,800 mm. An inner diameter SD of a small inner diameter portion SDP of an upper flow straightening cylinder 6A was 175 mm and an inner diameter LD of a large inner diameter portion LDP was 195 mm. These values satisfied a relationship, LD−SD>(FL−CL)/2.

The number of flow straightening holes 8a having a diameter of 5 mm and provided to the large inner diameter portion LDP was 350. A pitch of the flow straightening holes 8a in a direction parallel to an inserted direction (vertical direction of the upper flow straightening cylinder 6A) of the hollow fiber membranes was 10 mm and a pitch in a vertical direction (circumferential direction of the upper flow straightening cylinder 6A) was 15 mm. The small inner diameter portion SDP of the upper flow straightening cylinder 6A was extended 5 mm inward (downward) in the axial direction of the cylindrical case 1 from the lower surface 13aLS.

By using the hollow fiber membrane module M1, a filtrate manufacturing operation test was conducted. As raw water, water from Lake Biwa was subjected to constant flow rate filtration at a membrane filtration flux of 3.0 m$^3$/(m$^2$·d). After 30 minutes since the start of the filtration, an air-scrubbing and back-pressure simultaneous washing step was conducted, in which washing water for back-pressure washing was fed from a filtrate outlet 11 at a membrane filtration flux of 4.5 m$^3$/(m$^2$·d), air was fed from a feed port 12 at 100 L/min, and back-pressure washing water and air was caused to flow out from a discharge port 9 was conducted for one minute. The filtration step and the air-scrubbing and back-pressure simultaneous washing process were conducted repeatedly.

As a result, a membrane filtration pressure difference in the air-scrubbing and back-pressure simultaneous washing step of the hollow fiber membrane module M1, that was 70 kPa immediately after the start of the operation, was still 90 kPa after one year and it was possible to conduct stable operation.

In order to check if the hollow fiber membranes 2a were cut in the module M1, an air leak inspection was conducted. In the air leak inspection, the module was completely filled with water both on a raw-water side and on a filtrate side, 0.1 MPa compressed air was thereafter supplied from outside the hollow fiber membranes, and the hollow fiber membranes were visually examined as to whether bubbling from the openings 2aO thereof occurred or not. As a result of the air leak inspection, bubbling from the openings 2aO of the hollow fiber membranes was not observed and it was confirmed that the hollow fiber membranes 2a in the module M1 were not damaged.

When the module M1 after the operation was disassembled, no mark showing contact of the hollow fiber membranes 2a with the flow straightening holes 8a was found on the hollow fiber membranes 2a near the flow straightening holes 8a.

Example 2

An upper flow straightening cylinder 6A having a small inner diameter portion SDP with an inner diameter SD of 189 mm and a large inner diameter portion LDP with an inner diameter LD of 195 mm was used. These values satisfied a relationship, LD−SD>(FL−CL)/2. Except these changes, the same hollow fiber membrane module M1 as in Example 1 was produced and the same operation test as in Example 1 was conducted.

As a result, a membrane filtration pressure difference in air-scrubbing and back-pressure simultaneous washing of the hollow fiber membrane module M1, that was 120 kPa immediately after the start of the operation, was 150 kPa after six months and it was possible to conduct stable operation.

As a result of the air leak inspection, bubbling from openings 2aO of hollow fiber membranes 2a was not observed and it was confirmed that the hollow fiber membranes 2a in the module M1 were not damaged.

When the module M1 after the operation was disassembled, no mark showing contact of the hollow fiber membranes 2a with flow straightening holes 8a was found on the hollow fiber membranes 2a near the flow straightening holes 8a.

Comparative Example 1

The same hollow fiber membrane module as in Example 1 was produced, except that a hollow fiber membrane open end fixing member (upper fixing member) 13a had a thickness of about 110 mm and that a lower surface 13aLS was disposed at a large inner diameter portion LDP, and the same operation test as in Example 1 was conducted.

As a result, a membrane filtration pressure difference in air-scrubbing and back-pressure simultaneous washing of the hollow fiber membrane module, that was 70 kPa immediately after the start of the operation, was still 95 kPa after one year and it was possible to conduct stable operation.

As a result of the air leak inspection, however, leaks from eight positions were found from openings 2aO of hollow fiber membranes 2a.

When the module after the operation was disassembled, no mark showing contact of the hollow fiber membranes 2a with flow straightening holes 8a was found on the hollow fiber membranes 2a near the flow straightening holes 8a. However, it was confirmed that the hollow fiber membranes 2a was cut at a lower surface 13aLS.

Comparative Example 2

The same hollow fiber membrane module as in Example 1 was produced, except that a straight flow straightening cylinder having an inner diameter of 195 mm was used, and the same operation test as in Example 1 was conducted.

As a result, a membrane filtration pressure difference in air-scrubbing and back-pressure simultaneous washing of the hollow fiber membrane module, that was 200 kPa immediately after the start of the operation, was 300 kPa after three months and it was impossible to conduct stable operation.

As a result of the air leak inspection, leaks from 10 positions were found from openings 2aO of hollow fiber membranes 2a. All the leak positions were at an outer periphery of the hollow fiber membrane bundle.

When the module after the operation was disassembled, marks showing that the hollow fiber membranes 2a near flow straightening holes 8a had come in contact with the flow straightening holes 8a and gotten shaved were found and the leaks from the positions were confirmed.

The hollow fiber membrane module according to the invention includes a hollow fiber membrane module with the reduced pressure loss in the water discharge at the high flow rate and less damage to the membranes and is suitably used for a water purification treatment, production of industrial water, a wastewater treatment, a pretreatment of raw water in a water treatment using reverse osmosis membranes.

DESCRIPTION OF REFERENCE SIGNS

1: Cylindrical case
2: Hollow fiber membrane bundle

2a: Hollow fiber membrane
2aO: Opening
2aC: Closed portion
3: Case main body
4a: Upper socket
4b: Lower socket
5a: Upper cap
5b: Lower cap
6A: Upper flow straightening cylinder
6a: Upper flow straightening cylinder
6b: Lower flow straightening cylinder
7a: Upper annular flow path
7b: Lower annular flow path
8a, 8b: Flow straightening holes
9: Discharge port (nozzle)
10: Feed port
11: Filtrate outlet
12: Second feed port
13a: Hollow fiber membrane open end fixing member (upper fixing member)
13aLS: Lower surface (inner surface)
13aUS: Upper surface (Outer surface)
13b: Hollow fiber membrane sealed end fixing member (Lower fixing member)
13bLS: Lower surface (Outer surface)
13bUS: Upper surface (Inner surface)
14: Through hole
CL: Distance
FL: Length of hollow fiber membrane
LA: Cross-sectional area of large inner diameter portion
LD: Inner diameter of large inner diameter portion
LDP: Large inner diameter portion
M1: Hollow fiber membrane module
M4: Hollow fiber membrane module
SA: Cross-sectional area of small inner diameter portion
SD: Inner diameter of small inner diameter portion
SDP: Small inner diameter portion
SDPL: Length from lower surface (inner surface) of hollow fiber membrane open end fixing member (upper fixing member) to lower end face of small inner diameter portion
SL: Line segment showing inner diameter transition zone
θ: Inclination

The invention claimed is:

1. A hollow fiber membrane module including:
a cylindrical case having one nozzle at the minimum in a side face thereof;
a hollow fiber membrane bundle provided in the cylindrical case; and
a flow straightening cylinder provided between the one nozzle at the minimum and an outer periphery of the hollow fiber membrane bundle and having a plurality of flow straightening holes,
in which the hollow fiber membrane bundle includes a plurality of hollow fiber membranes, that are open at one end and sealed at the other end, or at least one U-shaped hollow fiber membrane, that is open at opposite ends, and includes a hollow fiber membrane open end fixing member for fixing the open end of each of the hollow fiber membranes,
a side peripheral face of the hollow fiber membrane open end fixing member is joined to an inner peripheral face of the cylindrical case,
each of the hollow fiber membranes passes through the hollow fiber membrane open end fixing member,
each of the open ends is positioned at an outer surface of the hollow fiber membrane open end fixing member, the outer surface positioned outside the cylindrical case, and
the flow straightening cylinder is fixed to the hollow fiber membrane open end fixing member,
wherein the flow straightening cylinder includes a large inner diameter portion and a small inner diameter portion having a smaller inner diameter than an inner diameter of the large inner diameter portion at least at a part in an axial direction of the flow straightening cylinder,
an inner surface of the hollow fiber membrane open end fixing member positioned on an opposite side from the outer surface and inside the cylindrical case is positioned at the small inner diameter portion of the flow straightening cylinder,
the flow straightening cylinder has a step between the small inner diameter portion and the large inner diameter portion, and
clearance is formed between the flow straightening holes of the flow straightening cylinder and the hollow fiber membrane bundle.

2. The hollow fiber membrane module according to claim 1,
wherein the hollow fiber membrane bundle includes a plurality of hollow fiber membranes that are open at one ends and sealed at the other ends,
the sealed end of each of the hollow fiber membranes is fixed to a hollow fiber membrane sealed end fixing member,
a side peripheral face of the hollow fiber membrane sealed end fixing member is joined to an inner peripheral face of the cylindrical case, and
the hollow fiber membrane sealed end fixing member has an inner surface positioned inside the cylindrical case and an outer surface positioned outside the cylindrical case.

3. The hollow fiber membrane module according to claim 2,
wherein, when the inner diameter of the large inner diameter portion is LD, the inner diameter of the small inner diameter portion is SD, a hollow fiber membrane length between the inner surface of the hollow fiber membrane open end fixing member and the inner surface of the hollow fiber membrane sealed end fixing member is FL, and a distance, in the axial direction, of the cylindrical case between the inner surface of the hollow fiber membrane open end fixing member and the inner surface of the hollow fiber membrane sealed end fixing member is CL, the flow straightening cylinder satisfies a relationship, $(LD-SD) > (FL-CL)/2$.

4. The hollow fiber membrane module according to claim 1, wherein a length, in an axial direction of the cylindrical case, of the small inner diameter portion from the inner surface of the hollow fiber membrane open end fixing member toward the large inner diameter portion is in the range of 3 mm to 40 mm.

5. The hollow fiber membrane module according to claim 1,
wherein, when a cross-sectional area of the small inner diameter portion of the flow straightening cylinder is SA and a cross-sectional area of the large inner diameter portion is LA, a ratio between SA and LA satisfies a relationship, $0.6 \leq SA/LA \leq 0.9$.

6. The hollow fiber membrane module according to claim 5, wherein the flow straightening cylinder has an inner diameter length transition zone in which an inner diameter of the flow straightening cylinder changes from an inner diameter satisfying the cross sectional area SA of the small inner diameter portion to an inner diameter satisfying the cross-sectional area LA of the large inner diameter portion between the small inner diameter portion and the large inner diameter portion.

7. The hollow fiber membrane module according to claim 1,
wherein all of the plurality of flow straightening holes of the flow straightening cylinder are provided at the large inner diameter portion.

8. The hollow fiber membrane module according to claim 1,
wherein a filling rate of the hollow fiber membranes in the hollow fiber membrane bundle positioned at the small inner diameter portion is in the range of 30% to 80%.

9. The hollow fiber membrane module according to claim 1,
wherein an outer diameter of the flow straightening cylinder at a portion where the small inner diameter portion is formed is smaller than an outer diameter of the flow straightening cylinder at a portion where the large inner diameter portion is formed.

* * * * *